United States Patent
Stretch et al.

(10) Patent No.: US 8,505,365 B2
(45) Date of Patent: Aug. 13, 2013

(54) MAGNETICALLY CODED PRESSURE DETECTION APPARATUS

(75) Inventors: Dale Arden Stretch, Novi, MI (US); David Gerard Genise, Marshall, MI (US)

(73) Assignee: Eaton Corporation, Cleveland, OH (US)

( * ) Notice: Subject to any disclaimer, the term of this patent is extended or adjusted under 35 U.S.C. 154(b) by 59 days.

(21) Appl. No.: 13/049,515

(22) Filed: Mar. 16, 2011

(65) Prior Publication Data

US 2011/0226047 A1    Sep. 22, 2011

Related U.S. Application Data

(60) Provisional application No. 61/314,197, filed on Mar. 16, 2010, provisional application No. 61/314,194, filed on Mar. 16, 2010.

(51) Int. Cl.
*G01M 15/08* (2006.01)

(52) U.S. Cl.
USPC ..................... 73/114.18; 73/114.79

(58) Field of Classification Search
USPC ......................... 73/114.18, 114.79
See application file for complete search history.

(56) References Cited

U.S. PATENT DOCUMENTS

| | | | |
|---|---|---|---|
| 4,491,010 A | 1/1985 | Brandt et al. | |
| 4,969,352 A | 11/1990 | Sellnau | |
| 5,367,904 A | 11/1994 | Sellnau | |
| 5,769,043 A * | 6/1998 | Nitkiewicz | 123/90.11 |
| 6,057,692 A | 5/2000 | Allmendinger | |
| 6,318,342 B1 | 11/2001 | Simon et al. | |
| 6,476,599 B1 * | 11/2002 | Czimmek et al. | 324/207.16 |
| 6,550,494 B2 * | 4/2003 | Yoneda et al. | 137/554 |
| 6,561,036 B1 | 5/2003 | Gustafsson et al. | |
| 6,633,157 B1 * | 10/2003 | Yamaki et al. | 324/207.2 |
| 6,973,820 B2 | 12/2005 | Watarai et al. | |
| 6,989,669 B2 | 1/2006 | Low | |
| 7,034,527 B2 | 4/2006 | Low | |

(Continued)

FOREIGN PATENT DOCUMENTS

| DE | 20309702 | 9/2003 |
|---|---|---|
| DE | 102006040410 | 3/2008 |

(Continued)

OTHER PUBLICATIONS

International Search Report (Corresponding Application: PCT/US2011/028677); European Patent Office; Authorized Officer Cilissen, M.; Issued Sep. 28, 2011; (3 pages).

(Continued)

*Primary Examiner* — Freddie Kirkland, III
(74) *Attorney, Agent, or Firm* — Remarck Law Group PLC (57) ABSTRACT

An apparatus for measuring pressure comprises a housing and an actuator pressure sealed to the housing and having a shaft. The actuator is configured to be in pressure communication with a volume of gas or liquid. Upon a change in pressure, the actuator is displaced at least partially in the axial direction. A sensor detects axial displacement of a magnetically encoded target upon the change in pressure in the volume. A device for measuring pressure in an engine cylinder comprises a valve in pressure communication with an engine cylinder. The valve stem has a magnetic coding located adjacent a sensor. Axial displacement of the stem under cylinder pressure is detected and pressure is obtained.

29 Claims, 7 Drawing Sheets

(56) References Cited

U.S. PATENT DOCUMENTS

| | | | |
|---|---|---|---|
| 7,051,639 B2* | 5/2006 | Krone et al. | 91/1 |
| 7,116,097 B2* | 10/2006 | Revankar et al. | 324/207.13 |
| 7,117,726 B1 | 10/2006 | Krieger | |
| 7,259,553 B2 | 8/2007 | Arns | |
| 7,307,418 B2 | 12/2007 | Low | |
| 7,439,733 B2 | 10/2008 | Arns | |
| 7,730,771 B2 | 6/2010 | Ludwig et al. | |
| 7,737,685 B2 | 6/2010 | Low | |
| 7,755,350 B2 | 7/2010 | Arns | |
| 8,096,170 B2 | 1/2012 | Mayrhofer | |
| 8,151,636 B2* | 4/2012 | Siraky | 73/114.28 |
| 2009/0082944 A1 | 3/2009 | Frank et al. | |
| 2009/0090189 A1 | 4/2009 | Villaire | |
| 2009/0293597 A1 | 12/2009 | Andrie | |
| 2010/0246061 A1 | 9/2010 | Sechi | |
| 2011/0226047 A1 | 9/2011 | Stretch | |
| 2012/0163412 A1* | 6/2012 | Stretch | 374/144 |

FOREIGN PATENT DOCUMENTS

| | | | |
|---|---|---|---|
| DE | 102006040410 A1 * | 3/2008 | |
| DE | 102010002109 | 8/2011 | |
| EP | 1662113 A | 5/2006 | |
| JP | 2000130122 A | 5/2000 | |
| JP | 2000180304 A | 6/2000 | |
| JP | 2012193724 A | 10/2012 | |

OTHER PUBLICATIONS

Written Opinion of the Authorized Searching Authority (Corresponding Application: PCT/US2011/028677); European Patent Office; Authorized Officer Cilissen, M.; Issued Sep. 28, 2011; (6 pages).

Pressure Sensors for Combustion Analysis, AVL Product Catalog—Edition 2011, pp. 1-123, AVL Group, Graz, Austria, Jan. 2011.

Citizen Finetech Miyota Co., Ltd., "Combustion Pressure Sensor", pp. 1-3, Japan, 2013.

Dr. Ing. Ha-Duong Ngo, "Pressure Measurement in Combustion Engines", Microsensor & Actuator Technology Center, Berlin Germany, http://www-mat.ee.tu-berlin.de/research/sic_sens/sic_sen3.htm.

Dr. Manoochehr Rashid!, "In-Cylinder Pressure and Flame Measurement", 3rd Conference on IC engines, Shiraz University, Tehran, 2004.

Kamran Shahroudi, "Robust Design Evolution and Impact of In-Cylinder Pressure Sensors to Combustion Control and Optimization: A Systems and Strategy Perspective", Massachusetts Institute of Technology, Jun. 2008.

Sussex University "In-Cylinder Pressure Measurement and Analysis", pp. 1-121, East Sussex, United Kingdom, http://www.sussex.ac.uk/Users/tafb8/eti/eti_17_InCylinderMeasurement.pdf.

International Search Report and Written Opinion for PCT/US2013/029017 dated Jun. 4, 2013.

* cited by examiner

MAGNETICALLY CODED PRESSURE DETECTION APPARATUS

PRIORITY

This application claims priority to U.S. Provisional Application No. 61/314,197, filed Mar. 16, 2010, and U.S. Provisional Application No. 61/314,194, filed Mar. 16, 2010. The entirety of these applications are incorporated herein.

FIELD OF THE INVENTION

This application is directed to pressure detectors using magnetic coding, including internal combustion engine cylinder pressure detectors.

BACKGROUND

Indirect measures of pressure of volumes of gas or fluid are useful in many contexts and are used in numerous everyday applications. In internal combustion engines, knowledge of the instantaneous pressure in an engine cylinder assists in management of parameters that effect engine efficiency and pollution emission, such as variable valve timing, lean burn and minimum timing for best torque.

SUMMARY

In one embodiment, an apparatus for measuring pressure comprises a housing having a housing wall. An actuator has a shaft and is configured to be pressure sealed to the housing wall. The actuator is in pressure communication with a volume of liquid or gas having a measurable pressure. Upon a change in pressure in the volume, the actuator is displaced at least partially in the axial direction. The shaft has a magnetically encoded target that is detected by a static sensor by detecting axial displacement of the magnetically encoded target relative to the static sensor upon the change in pressure in the pressurized volume.

In another embodiment, an apparatus for measuring pressure in a cylinder of an internal combustion engine comprises an engine valve having a valve head and a valve stem extending from valve head in an axial direction. The valve head is configured to form a pressure seal against a valve seat. The valve head has a valve face configured to be in pressure communication with an engine cylinder. The valve stem is configured to extend through an opening in a valve guide secured to the engine block of the internal combustion engine. The valve stem has a magnetic coding disposed on the stem. The coding is placed on the stem at a location adjacent a magnetic coding sensor rigidly secured to the internal combustion engine. The sensor is configured to detect axial displacement of the valve stem resulting from deformation of the valve head under cylinder pressure and provide cylinder pressure information corresponding to the detected axial displacement.

BRIEF DESCRIPTION OF THE DRAWINGS

It will be appreciated that the illustrated boundaries of elements in the drawings represent only one example of the boundaries. One of ordinary skill in the art will appreciate that a single element may be designed as multiple elements or that multiple elements may be designed as a single element. An element shown as an internal feature may be implemented as an external feature and vice versa.

Further, in the accompanying drawings and description that follow, like parts are indicated throughout the drawings and description with the same reference numerals, respectively. The figures may not be drawn to scale and the proportions of certain parts have been exaggerated for convenience of illustration.

DETAILED DESCRIPTION

Certain terminology will be used in the following description for convenience in describing the figures will not be limiting. The terms "upward," "downward," and other directional terms used herein will be understood to have their normal meanings and will refer to those directions as the drawing figures are normally viewed.

Figure 1:
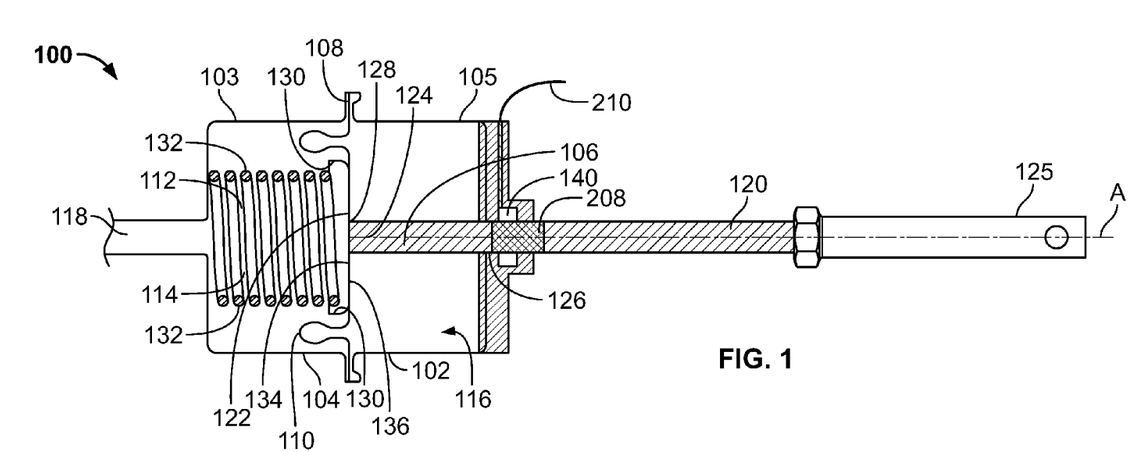
FIG. 1 illustrates a cross-sectional view of an exemplary pressure detection device 100.

FIG. 1 illustrates a cross-sectional view of an exemplary pressure detection device 100 according to the present disclosure. A housing 102 has a housing wall 104 formed by a first and second housing member 103, 105 joined at pressure-tight seam 108. A deformable member 110, which may take the form of a diaphragm, and may for example be made of rubber, plastic or metal, is sealed between the first and second housing members 103, 106. The deformable member 110 separates the cavity 112 formed by the housing wall 104 into two chambers: a first chamber or pressure chamber 114 and a second chamber 116. The pressure chamber 114 is in pressure communication with a pressure source (not shown) through tap 118. In the embodiment illustrated in FIG. 1, the housing wall 104, along with the deformable member 110, form the pressure chamber 114. In other embodiments, the pressure chamber 114 may for example be enclosed by a distinct chamber wall separate from the housing wall 104. In yet other embodiments, the second chamber 116 serves as the pressure chamber 114.

The actuator 106 comprises an actuator shaft 120 that extends along axis A from the first end 124 to the second end 125 of actuator 106. For purposes of this disclosure, the terms "axial," "axially" will be understood to refer to the direction lying along the longitudinal axis A of the shaft 120. The actuator 106 has a push plate 122 at its first end 124. The push plate 122 is sealed against the deformable member 110 to prevent leakage from the pressure chamber 114. The shaft 120 extends from the push plate 122 through a deformable member aperture 128, and extends outside of the cavity 112 through a shaft aperture 126 in the housing 102. The push plate 122 has a U-shaped cross-section, as it has a continuous lip 130 around its outer perimeter. The lip 130 protects the deformable member 110 from damage that could otherwise occur from contact with a sharp edge at the perimeter of the push plate 122. As seen in FIG. 1, the push plate 122 is located within the pressure chamber 114. The push plate 122 has a first face 134 facing in the direction from the second end 125 of the actuator 106, in this case toward the pressure chamber 114, and an opposing second face 136 that forms the seal with the deformable member 110. A sensor 140 is secured to the housing wall 104 adjacent the shaft aperture 126. The sensor 140 is sensitive to magnetic field, and may be a non-contacting Hall-effect sensor or a magnetoresistive sensor. As described below, the sensor 200 is configured to send electrical signals corresponding to the displacement of the target through sensor wires 210.

Sensor springs 132 are secured at one end to the push plate 122, and at the opposite end to the housing wall 104. In the illustrated embodiment, the springs 132 are secured to the portion of the housing wall 104 that forms pressure chamber 114. The sensor springs 132 serve to provide an axial force in direction opposite the direction the push plate 122 is displaced from equilibrium in the axial direction A.

In the illustrated arrangement, the push plate 122 and deformable member 110 are in pressure communication with the pressure chamber 114. When an increase in pressure is applied to the pressure chamber 114 through the tap 118, the push plate 122 and deformable member 110 are displaced in the in the axial direction A toward the second end 125 of the actuator 106. This expands the volume of the pressure chamber 114 and decreases the volume of the second chamber 116. The axial motion of the push plate 122 causes the shaft 120 to move axially through the shaft aperture 126 of the housing 102. The sensor spring 132 pulls on the push plate 122 and constrains the growth in pressure chamber 114 volume.

Figure 2:
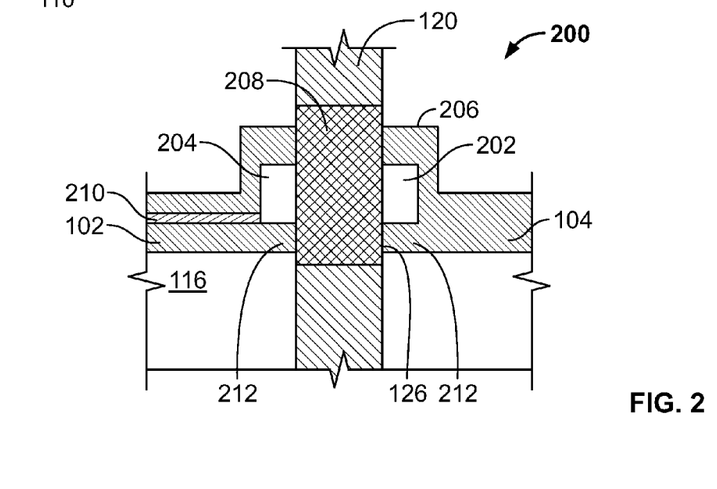
FIG. 2 illustrates a sensor 200 secured to the housing wall 104 of the device 100 shown in FIG. 1.

FIG. 2 illustrates the sensor 200 secured to the housing wall 104 at the shaft aperture 126 of the device 100 shown in FIG. 1. The shaft 120 moves axially relative to the sensor 200. In some embodiments, pressure seals 212 assist in maintaining pressure in cavity 112, in particular where the sensor mount 206 is secured to the portion of the housing wall 104 adjacent the pressure chamber 114. The sensor 200 has two magnetic sensor pickups 202, 204 that are secured to a rigid sensor mount 206. The rigid sensor mount 206 is secured to the housing wall 104 and holds the sensor pickups 202, 204 stationary relative to the housing 102. Holding the sensor pickups 202, 204 stable with respect to the sensor housing 102 assists in the accuracy of the sensor's 200 measurements. As will be described further below, the magnetic sensor pickups 202, 204 are located adjacent a magnetic target 208 disposed at a fixed position on the shaft 120. The pickups 202, 204 detect small axial displacements of the target 208 and therefore of the shaft 120. The sensor 200 is configured to send electrical signals corresponding to the displacement of the target 208 through sensor wires 210.

Figure 3:
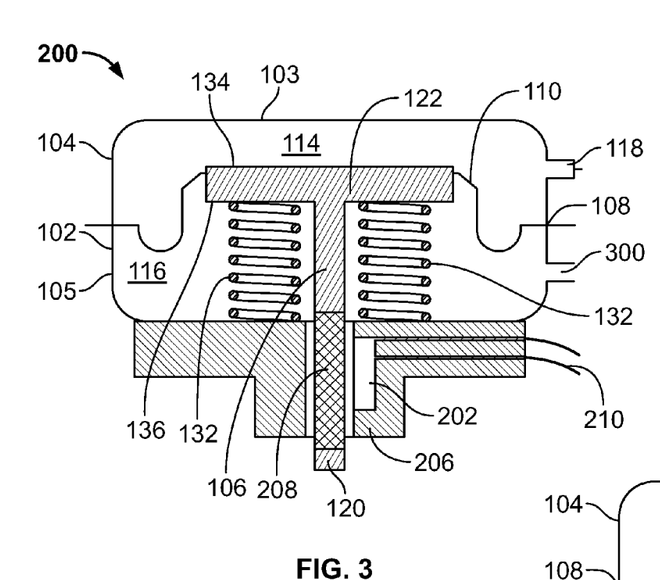
FIGS. 3, 4A and 4B illustrate cross-sectional views of alternative embodiments of the pressure detection device 100 of the present disclosure.
Figure 4A:
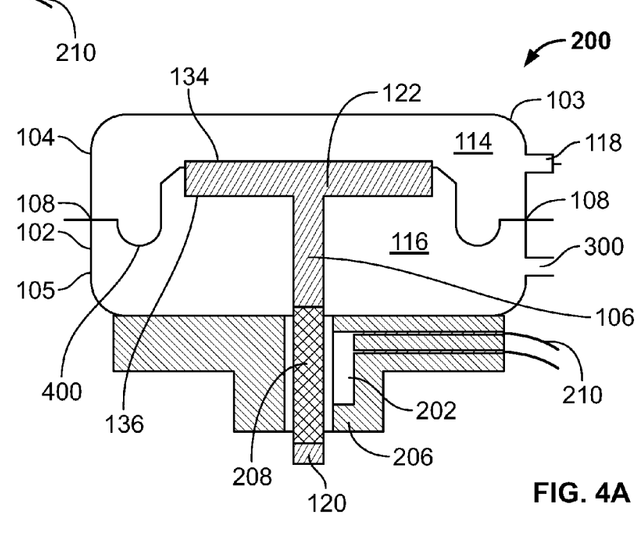

FIGS. 3, 4A and 4B illustrate alternative embodiments of the pressure detection device 100 shown in FIG. 1. In FIG. 3, the sensor springs 132 are not located in the pressure chamber 114. Instead, the springs 132 are secured to the second face 136 of the push plate 122 at one end and to the portion of the housing wall 104 that forms second chamber 116 at the other end. A vent 300 allows the second chamber 116 to maintain constant pressure even as the volume of the second chamber 116 changes as a result of the motion of deformable member 110 and push plate 122. Like the embodiment shown in FIG. 1, the sensor springs 132 provide an axial force opposite the direction the push plate 122 displaces the springs 132 from their equilibrium position. A single sensor pickup is 202 secured to the housing 102 by rigid sensor mount 206. In yet another alternative shown in FIG. 4A, the springs 132 are removed and replaced by a resilient deformable member 400 that responds to axial displacement by exerting a force in the direction opposite the displacement.

Figure 4B:
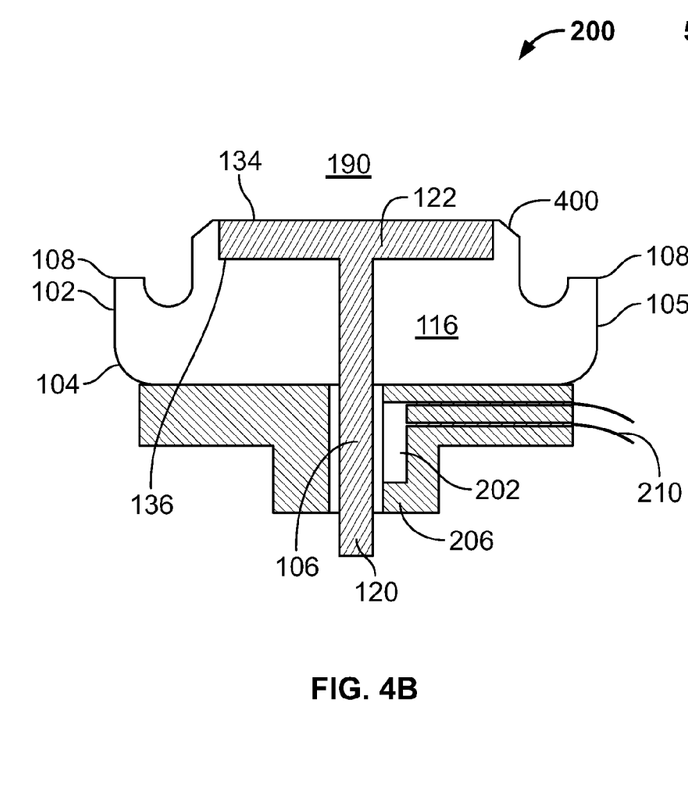

FIG. 4B shows a modified version of the embodiment in FIG. 4A. In FIG. 4B, the housing 102 comprises a second housing member 105 joined at pressure-tight seam 108 to a resilient deformable member 400. In this embodiment, the resilient deformable member 400 separates the second chamber 116 from a volume 190 of, for example a liquid or gas, that has a measureable pressure. Examples of such volumes 190 are local atmospheric gas and cylinders of an internal combustion engine. The actuator 106 is in pressure communication with the volume 190, and pressure sealed against the push plate 122. The sensor 200 can thus measure the pressure of the volume 190 by detecting the movement induced in shaft 120 caused by, for example, the pressure difference between the volume 190 and chamber 116. In yet other embodiment, the actuator 106 may function as a resilient deformable member 400. An example of such an embodiment is the pressure seal of an engine valve secured against a valve seat during cylinder combustion. In embodiments were a metal actuator 106 is pressure sealed, for example to a housing 102, and acts as resilient deformable member 400, the deformation will be small.

Figure 5:
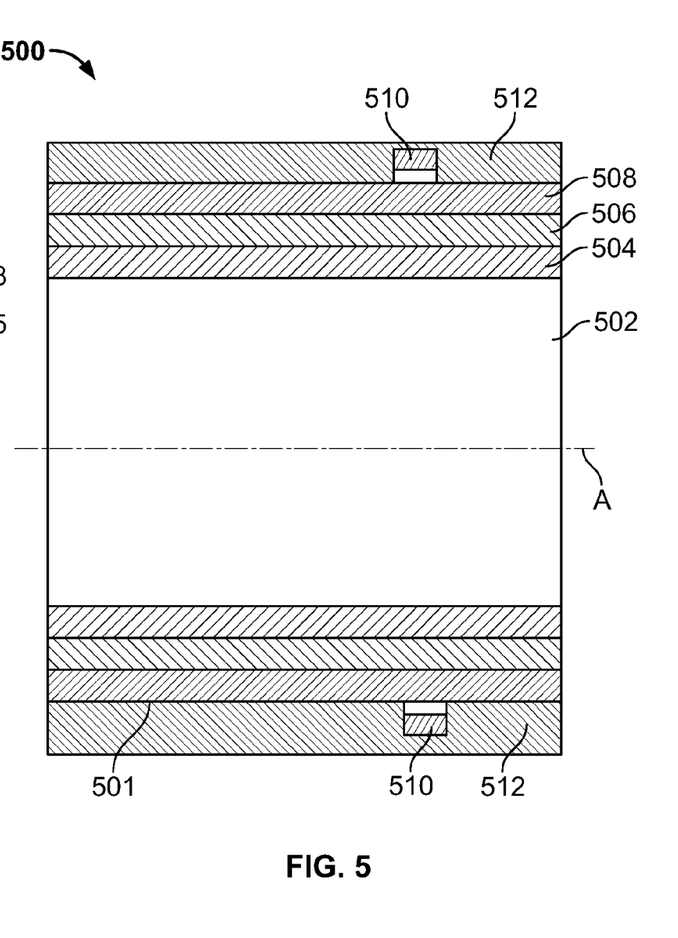
FIG. 5 illustrates a cross-sectional view of an embodiment of the magnetically encoded actuator shaft 500 according to the present disclosure.

FIG. 5 illustrates a cross-sectional view of an embodiment of the actuator shaft 500 upon which a target 501 has been placed according to the present disclosure. As illustrated in FIG. 5, the shaft 500 is generally cylindrical and has a core 502. The core may be made of magnetic material, such as plain carbon or alloy steels; partially magnetic materials such as austenitic stainless steels; or non-magnetic materials such as aluminum, titanium, polymers and composites. In the preferred embodiment, a nickel isolation layer 504 is placed over the core. A nickel-cobalt magnetic layer 506 is disposed over the isolation layer. Finally, an optional protective layer 508, for example electroplated hard chromium (EHC), is disposed over the magnetic layer 506.

The isolation layer 504 is preferably made of a magnetic flux trapping alloy such as nickel phosphorus, which improves detection by the sensor pickups 510. Preferably, the isolation layer is deposited by an electroless nickel plating process. The thickness of the isolation layer 504 is approximately 15 microns and is substantially uniform in thickness over the target 501 area. Standard electroplating techniques are used to deposit the nickel-cobalt magnetic layer 506. The thickness of this layer 506 is approximately 15 to 20 microns. A number of alternative materials like Co—N—P, Co—W, Co—Cr and others can be substituted as the magnetic layer. An alternative to the use of plated coatings is to use the base material(s) directly as the magnetic media. This eliminates the need for an isolation layer coating, a magnetic layer and a protective layer. A number of Co—Cr—Fe and Co—Ni—Cr—Fe alloys are suitable as magnetic media and also can be used as a valve or valve stem material.

The magnetic layer 506 allows information to be recorded onto the shaft 500 using standard magnetic recording methods, thereby magnetically encoding the shaft 500 with information that allows the sensor pickups 510 to detect the position of the shaft 500. The sensor pickups 510 are sensitive to magnetic flux, and as described above, the sensor pickups 510 are fixed relative to the moveable shaft 500, for example by fixing the pickups 510 to a mount 512 that remains fixed relative to the shaft 500. As shown in FIG. 5, the pickups 510 are not in contact with the magnetically encoded shaft 500, but instead are mounted near the shaft 500. The magnetic encoding layer 506 need not be placed along the entirety of the shaft 500, but may be limited to portions of the shaft 500 that may be detected or read by the pickups 510 during operation of the device, for example as with target 208 shown in FIGS. 1 and 2.

Various methods of encoding the shaft 500 may be used according to the present disclosure. In one example, evenly-spaced magnetic domains are recorded along the axial direction of the shaft 500. The pickups 510 are able detect each passing domain, and are thereby able to provide this information to connected circuitry (not shown). The circuitry can then readily obtain the distance traveled by the shaft 500. The calculated pressure will be a function of the distance traveled by the shaft 500. By providing the circuitry with the relationship between the relative position of the shaft 500 and the corresponding pressure in the pressurized chamber 114 shown, for example, in FIGS. 1, 3 and 4A, information provided by the sensors 200 can be processed by the circuitry to determine the amount of pressure in a pressure chamber 114. Such relationships can be represented by tables stored in computer memory matching the signals provided by the sensors 200 to the amount of displacement, and correspondingly to the amount of pressure.

Under certain circumstances, the protective layer 508 and/or the nickel isolation layer 504, may not be necessary. For example, where the magnetic layer 506 is sufficiently hard and/or durable, the protective layer 508 may not be necessary. In another example, where the magnetic layer 506 provides signal of sufficient strength to the pickups 510 without the benefit of an isolation layer 504, the isolation layer 504 may be omitted.

Figure 6:
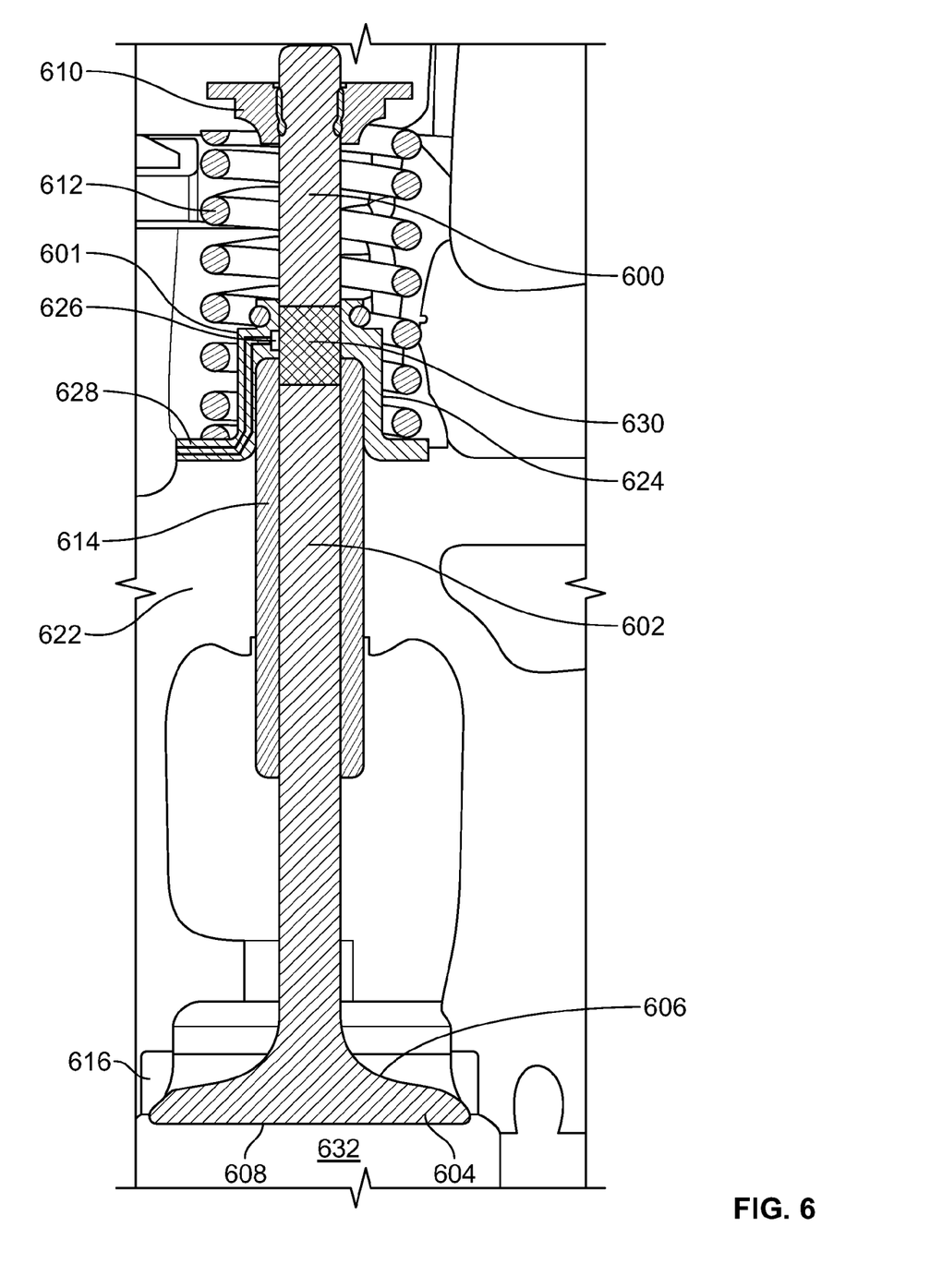
FIG. 6 illustrates a cross-sectional view of an internal combustion engine cylinder pressure detection device according to the present disclosure.

FIG. 6 illustrates a cross-sectional view of another embodiment according to the present disclosure. Here, a valve 600, which may be either an exhaust valve or intake valve, has a valve stem 602 and a head 604, with a transition 606 between the stem 602 and head 604, and a valve face 608. As shown in FIG. 6, the valve works in combination with several common valve train components, such as the valve retainer 610, the valve spring 612, valve guide 614 and valve seat 616. The valve seat 616 and valve guide 614 are both secured to the cylinder head 622 of the internal combustion engine (not shown). The valve guide 614 and/or valve seat 616 may in certain circumstances be integrated into the internal combustion engine.

As shown in FIG. 6, a rigid sensor mount 624 for sensor 601 is secured to the cylinder head 622 and a portion of the valve guide 614. The rigid mount 624 surrounds the portion of the stem 602 that extends from the top of valve guide 614. A magnetic sensor pickup 626 is secured within the rigid sensor mount 624. Wire 628 runs from the pickup 626 to transmit electrical signal corresponding to the magnetic coding detected by the pickup 626. A magnetic target 630, made for example by depositing an isolation layer 504, magnetic layer 506 and protective layer 508 according to the description associated with FIG. 5, is located on the portion of the stem 602 that is adjacent the pickup 626 when the valve is closed (i.e. when the valve head 604 is secured against the valve seat 616).

Figure 7A:
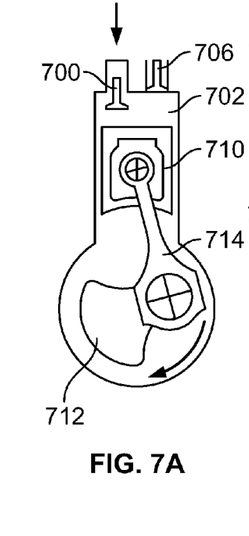
FIGS. 7A-7D, illustrate exemplary stages of an engine cylinder during an engine cycle.
Figure 7B:
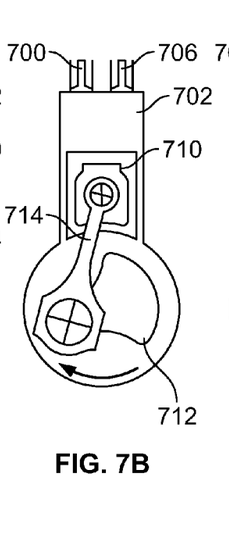
Figures 7C, 7D:
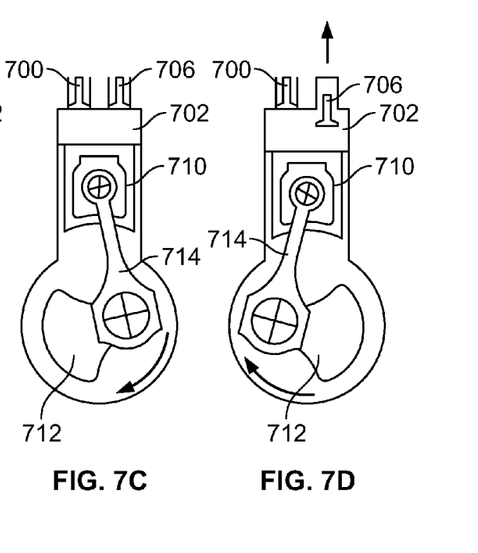

Pressure in the cylinder 632 varies during operation of the engine. FIGS. 7A-7D, illustrate four stages of an engine cycle in a typical cylinder 702 arrangement having an intake valve 700, exhaust valve 706, piston 710, a crank 712, connection rod 714. In FIG. 7A, which represents the suction stroke, the intake valve 700 is open, allowing air to enter the cylinder 702. When the piston 710 is at its lowest point, the intake valve closes and piston 710 moves upward toward its highest point during the compression stroke to increase the pressure in the cylinder 702, as shown in FIG. 7B. By introducing fuel into the cylinder 702 and igniting it, the pressure in the cylinder 702 increases greatly over a very short time interval, creating a downward force on the cylinder 702. During the working stroke shown in FIG. 7C, the cylinder 702 moves downward again toward its lowest point. As shown in FIG. 7D, during the exhaust stroke the exhaust valve 706 is open and the upward movement of piston 710 expels the exhaust gasses from the cylinder 702.

Figure 8:
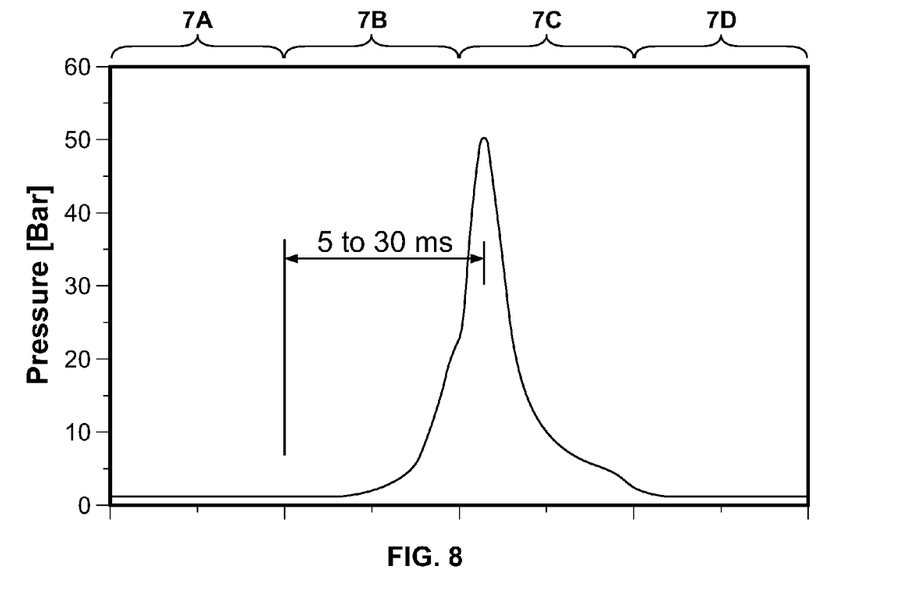
FIG. 8 illustrates a graph of the pressure in engine cylinder over the stages of an engine cycle identified in FIGS. 7A-7D.

FIG. 8 illustrates the changes in the pressure in the cylinder during an engine cycle. The left vertical axis reflects pressure in the cylinder in bars, while the horizontal axis represents time, the entirety of the horizontal axis representing a duration of one cycle. The intervals marked 7A-7D correspond to the stages shown in FIGS. 7A-7D: the suction stroke, the compression stroke, the working stroke and the exhaust stroke, respectively. As shown in FIG. 8, the pressure in the cylinder increases from less than 5 bars to approximately 50 bars from the beginning of the compression stroke to beginning of the working stroke where the pressure reaches a maximum cycle value. Such a change occurs over a time span ranging from approximately 5 to 30 milliseconds.

Referring again to FIG. 6, the valve 600 is closed during the compression and working strokes. At these points in time, the valve 600 is securely pressed against the valve seat 616, and pressure in the cylinder 632 applies an axial force against the face of valve 608. This axial force causes the valve head 604 to deform slightly. This slight axial deformation of the valve head 604 is elastic in nature, causing the valve stem 602 to temporarily move in the axial direction, and return once the pressure is released. This axial motion is detected by the pickup 626 as the target 630 moves past the pickup 626. The wire 628 carries electrical signal to circuitry (not shown) corresponding to the amount of relative motion of the stem 602. Importantly, the valve head 604 deforms by an amount dependent on the amount of pressure in the cylinder 632. Thus, by providing the circuitry with the relationship between the amount of axial displacement with the corresponding amount of pressure in the cylinder 632 required to cause the particular amount of displacement, the circuitry can provide the pressure level in the cylinder 632. Such relationships can be represented by tables matching the signals provided by the sensors 200 to the amount of displacement, and correspondingly to the amount of pressure in the cylinder 632. Such relationships will also necessarily depend on the design parameters of the system (e.g., the material comprising the valve head 604, the size and shape of the valve head 604, and the sensitivity of the pickups 626).

Maximizing the axial motion imparted to the stem 602 by a particular pressure level in the cylinder without compromising the durability of the valve 600 is advantageous. For a particular resolution level of the sensor pickup 626, increasing the number of domains that pass the pickup 626 for any particular pressure level detected, for example, increases the accuracy of the sensor 601.

Figure 9A:
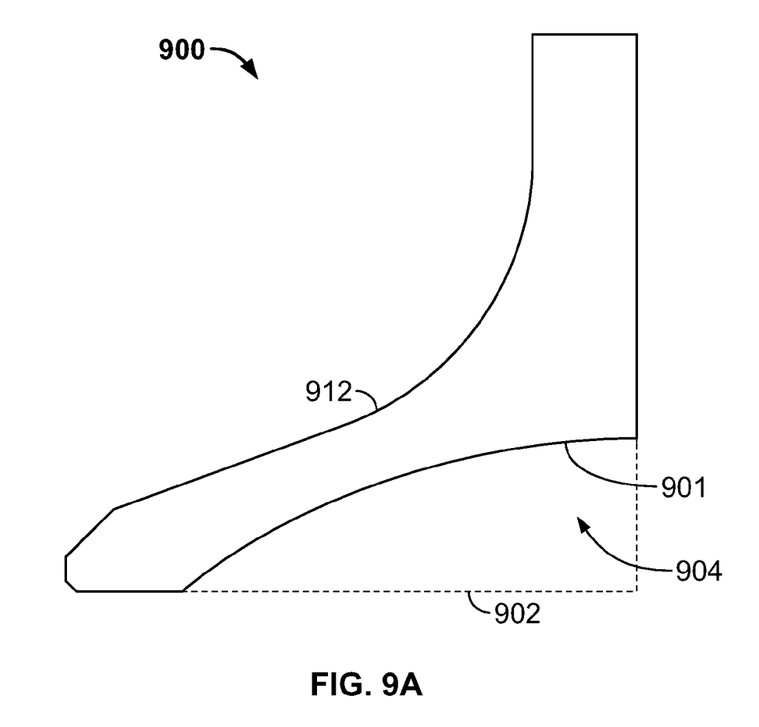
FIGS. 9A and 9B illustrate profiles of alternative valve head designs.
Figure 9B:
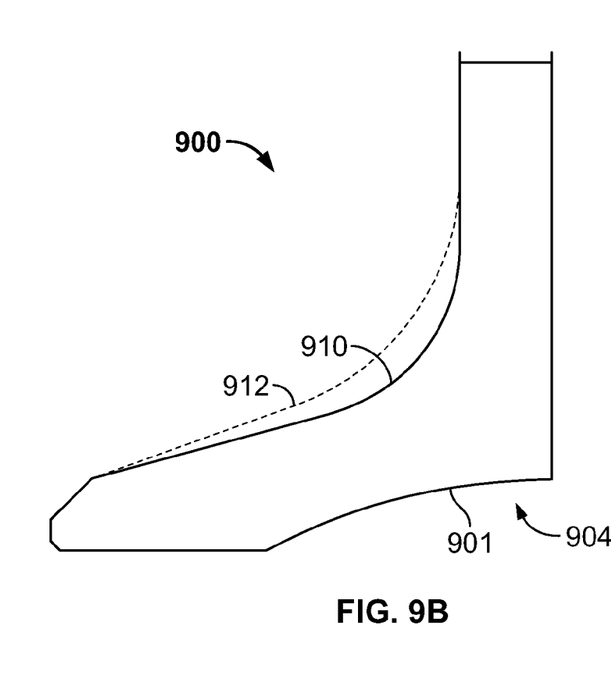

Several different valve head shapes may improve the amount of displacement without significantly compromising the strength and durability of the valve head 900. FIGS. 9A and 9B illustrate some profiles of alternative valve head designs. In FIG. 9A, a concave valve face 901 is shown relative to a standard valve face 902. In the illustrated embodiment, the recess 904 is an arcuate cross-sectional shape, however, the recess 904 may take other shapes. In other embodiments, the recess 904 may be conical. Additional shapes are also suitable for the recess 904. FIG. 9B illustrates a valve head 900 according to the present disclosure having a recessed transition region 910 compared to a standard transition region 912. The recessed transition region 910 allows for increased deformation of the valve head 900 relative to the standard transition region 910. The shape of the illustrated transition region 910 is chosen to minimize the stress caused to the valve head 900 by the deformation, but yet maximize the head 900 deflection. Preferably, the shape of the transition region 910 is chosen to create stress levels that are as uniform as possible over the valve head 900, and therefore avoiding scenarios where the valve head 900 has high stress and low stress regions, while still creating the maximum amount of deformation in the valve head 900. Materials suitable for valve head 900 construction are steel, and most preferably titanium.

Figure 10A:
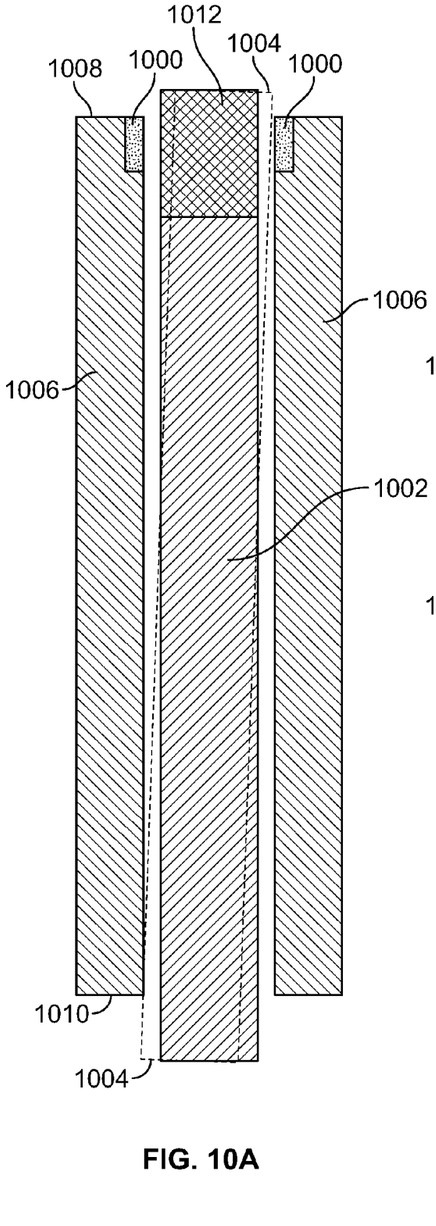
FIGS. 10A and 10B show alternative placements for one or more sensor pickups 1000.
Figure 10B:
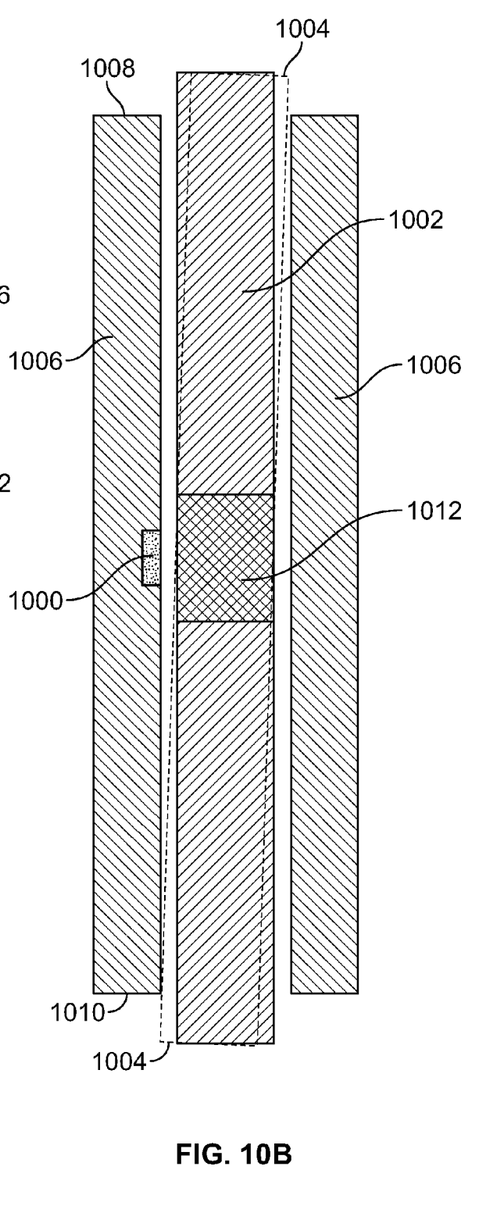

FIGS. 10A and 10B show alternative placements for one or more sensor pickups 1000, shown here secured within a valve guide 1006. During normal operation, the valve stem 1002 undergoes non-axial motion, such as shown by the outline 1004 in FIGS. 10A and 10B. In FIG. 10A, two sensor pickups 1000 are placed on opposing sides of the valve stem 1002 at the top of the valve guide 1006. At this location, the valve stem 1002 exhibits relatively greater amounts of motion than, for example, the portion of the valve stem 1002 located substantially equidistant between the first end 1008 and second end 1010 of the valve guide 1006, which exhibits minimal non-axial motion. Such motion has potential to increase the distance between a sensor pickup 1000 and a magnetic target 1012, which can impair the ability of the pickup 1000 to detect the magnetic target 1012. In order to compensate for the increased tilting motion of the valve stem 1002 near the end of the valve guide 1006, the sensor pickups 1000 are secured to the valve guide 1006 adjacent opposing sides of the valve stem 1002. Thus, as the valve stem 1002 moves away from one of the pickups 1000, it will move closer to the other pickup 1000. As the valve stem 1002 tilts in this way, the pickup 1000 closer to the valve stem 1002 will detect a downward movement, while the pickup 1000 further from the valve stem will detect an upward motion, thus mitigating the effects of the non-axial motion. Circuitry (not shown) can be configured to mitigate the effects of the tilting by averaging the number of magnetic domains detected by the two pickups 1000, which will serve to isolate axial motion from non-axial motion such as tilting of the valve stem 1002. In another example, circuitry can be configured to compensate for axial motion caused by titling by detecting signal strength, which will be dependent on the distance of the valve stem 1002 to the pickups 1000. The circuitry can store information regarding the relationship between signal strength and amount of tilting, and the resulting amount of adjustment to the detected axial motion is necessary.

The configuration shown in FIG. 10B illustrates another alternative configuration for the pickup 1000. In this embodiment, a single pickup 1000 is secured to the valve guide 1006 substantially equidistant between the first end 1008 and second end 1010 of the valve guide 1006. Due to the minimal non-axial motion of the stem 1002 at this location, a second pickup 1000 as illustrate is optional. The target 1012 is located adjacent the pickup 1000. In general, the pickups 1000 may be placed at any location along the valve guide 1006.

For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components. As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. From about X to Y is intended to mean from about X to about Y, where X and Y are the specified values.

While the present disclosure illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:

1. An apparatus for measuring pressure comprising:
a housing having a housing wall;
an actuator having a shaft extending along an axial direction from a first end of the actuator to a second end of the actuator, the actuator configured to be pressure sealed to the housing wall, in pressure communication with a volume enclosed by the housing wall,
wherein the volume includes a pressure chamber having a chamber wall comprising at least a portion of a deformable member configured to be displaced at least partially in the axial direction upon a change in pressure in the pressure chamber,
wherein the volume has a measurable pressure adjacent the first end of the actuator,
wherein the actuator is secured to the deformable member adjacent the first end of the actuator,
wherein the actuator is configured to be displaced at least partially in the axial direction upon a change in pressure in the volume, and
wherein the actuator is configured to transfer axial motion from the deformable member to the shaft;
the shaft having a magnetically encoded target configured to be detected by a static sensor by detecting axial displacement of the magnetically encoded target relative to the static sensor upon the change in pressure in the volume.

2. The apparatus of claim 1 wherein the housing comprises a shaft opening and the shaft is configured to extend through the shaft opening.

3. The apparatus of claim 2, wherein the static sensor is mounted to the housing adjacent the shaft opening and proximate to the magnetically encoded target.

4. The apparatus of claim 3, wherein the static sensor comprises a rigid mount secured to the housing and at least one sensor pickup.

5. The apparatus of claim 4, wherein the at least one sensor pickup comprise a first and second sensor pickup secured to the rigid mount disposed adjacent the magnetically encoded target and configured to isolate axial motion of the actuator.

6. The apparatus of claim 1 wherein the actuator comprises a rigid push plate secured to the deformable member adjacent the first end of the actuator.

7. The apparatus of claim 6 wherein the deformable member is pressure sealed to the push plate.

8. The apparatus of claim 6, further comprising a resilient spring member configured to exert a force on the push plate in a direction opposite to a direction of displacement of the push plate.

9. The apparatus of claim 6, further comprising:
at least one sensor spring having a first and second end, the first end of the spring secured to the push plate, the second end secured to the housing, the sensor spring configured to exert force in at least the axial direction.

10. The apparatus of claim 1, wherein the deformable member is configured to exert an axial force upon axial displacement of the deformable member.

11. An apparatus for measuring pressure in a cylinder of an internal combustion engine comprising:
an engine valve having a valve head and a valve stem extending from valve head in an axial direction, the valve head having a valve face configured to be in pressure communication with an engine cylinder;
the valve stem configured to extend through an opening in a valve guide secured to an engine block of the internal combustion engine, the valve stem having information magnetically encoded on the stem configured to be read by a magnetic coding sensor by detecting axial displacement of the valve stem resulting from deformation of the valve head under cylinder pressure, the sensor configured to provide cylinder pressure information corresponding to the detected axial displacement.

12. The apparatus of claim 11 wherein the magnetic coding sensor is rigidly secured to the engine block.

13. The apparatus of claim 11 wherein the magnetic coding sensor is rigidly secured to the valve guide.

14. The apparatus of claim 13 wherein the magnetic coding sensor comprises a first and second sensor pickup.

15. The apparatus of claim 14 wherein the valve guide has a first end adjacent the engine cylinder and a second end, the first and second sensor pickup secured to the valve guide adjacent the second end of the valve guide.

16. The apparatus of claim 11 wherein the magnetic coding sensor comprises at least one sensor pickup, the valve guide has a first end adjacent the engine cylinder and a second end, the sensor secured to the valve guide substantially equidistant from the first end of the valve guide and second end of the valve guide.

17. The apparatus of claim 11 wherein the valve face is a concave curved surface.

18. The apparatus of claim 11 wherein the engine valve comprises a recessed transition region configured to minimize deformation stress caused by valve head deformation.

19. The apparatus of claim 11, wherein the information magnetically encoded on the stem includes a plurality of evenly-spaced magnetic domains.

20. An apparatus for measuring pressure in a cylinder of an internal combustion engine comprising:
an engine valve having a valve head and a valve stem extending from valve head in an axial direction, the valve head having a valve face configured to be in pressure communication with an engine cylinder, the valve stem configured to extend through an opening in a valve guide secured to an engine block of the internal combustion engine, the valve stem having information magnetically encoded on the stem;
a magnetic coding sensor configured to be rigidly secured to the internal combustion engine adjacent the magnetic coding target, the sensor configured to detect axial displacement of the valve stem resulting from deformation of the valve head under cylinder pressure and provide cylinder pressure information corresponding to the detected axial displacement.

21. The apparatus of claim 20 wherein the magnetic coding sensor is configured to be rigidly secured to the engine block.

22. The apparatus of claim 21 wherein the magnetic coding sensor comprises a first and second sensor pickup.

23. The apparatus of claim 20 wherein the magnetic coding sensor is configured to be rigidly secured to the valve guide.

24. The apparatus of claim 23 wherein the valve guide has a first end adjacent the engine cylinder, and a second end, the first and second sensor pickup secured to the valve guide adjacent the second end of the valve guide.

25. The apparatus of claim 20 wherein the magnetic coding sensor comprises at least one sensor pickup, the valve guide has a first end adjacent the engine cylinder and a second end, the sensor secured to the valve guide.

26. The apparatus of claim 20 wherein the magnetic coding sensor comprises a rigid sensor mount the rigid sensor mount configured to be secured to the internal combustion engine.

27. The apparatus of claim 20 wherein the valve face is a concave curved surface.

28. The apparatus of claim 20 wherein the engine valve comprises a recessed transition region configured to minimize deformation stress caused by valve head deformation.

29. The apparatus of claim 20, wherein the information magnetically encoded on the stem includes a plurality of evenly-spaced magnetic domains.

* * * * *